Jan. 17, 1950     J. A. WEBER     2,494,732
ROLLING CONTACT DEVICE FOR MEASURING LENGTHS
OF FLEXIBLE HOSE, STRIP AND THE LIKE
Filed Aug. 30, 1945     2 Sheets-Sheet 2
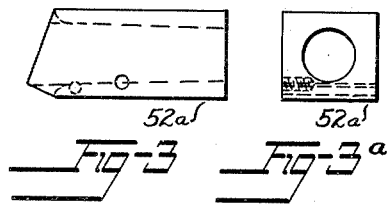
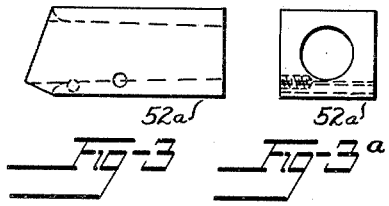
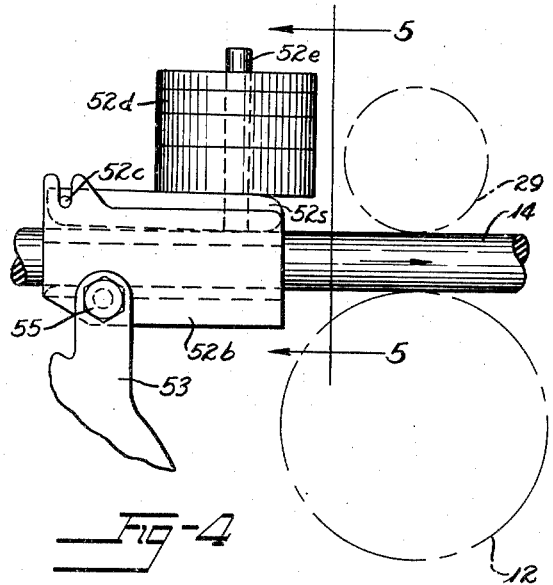
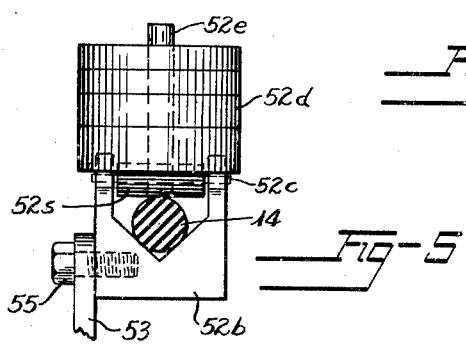
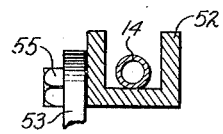
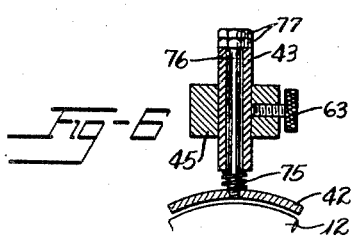
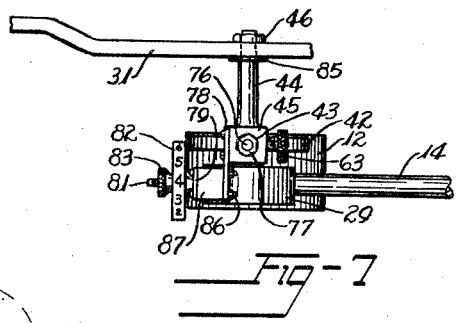
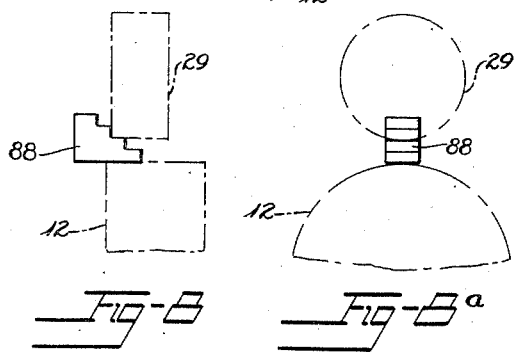
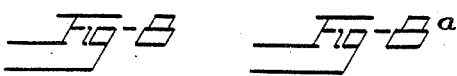
Inventor
John A. Weber Patented Jan. 17, 1950

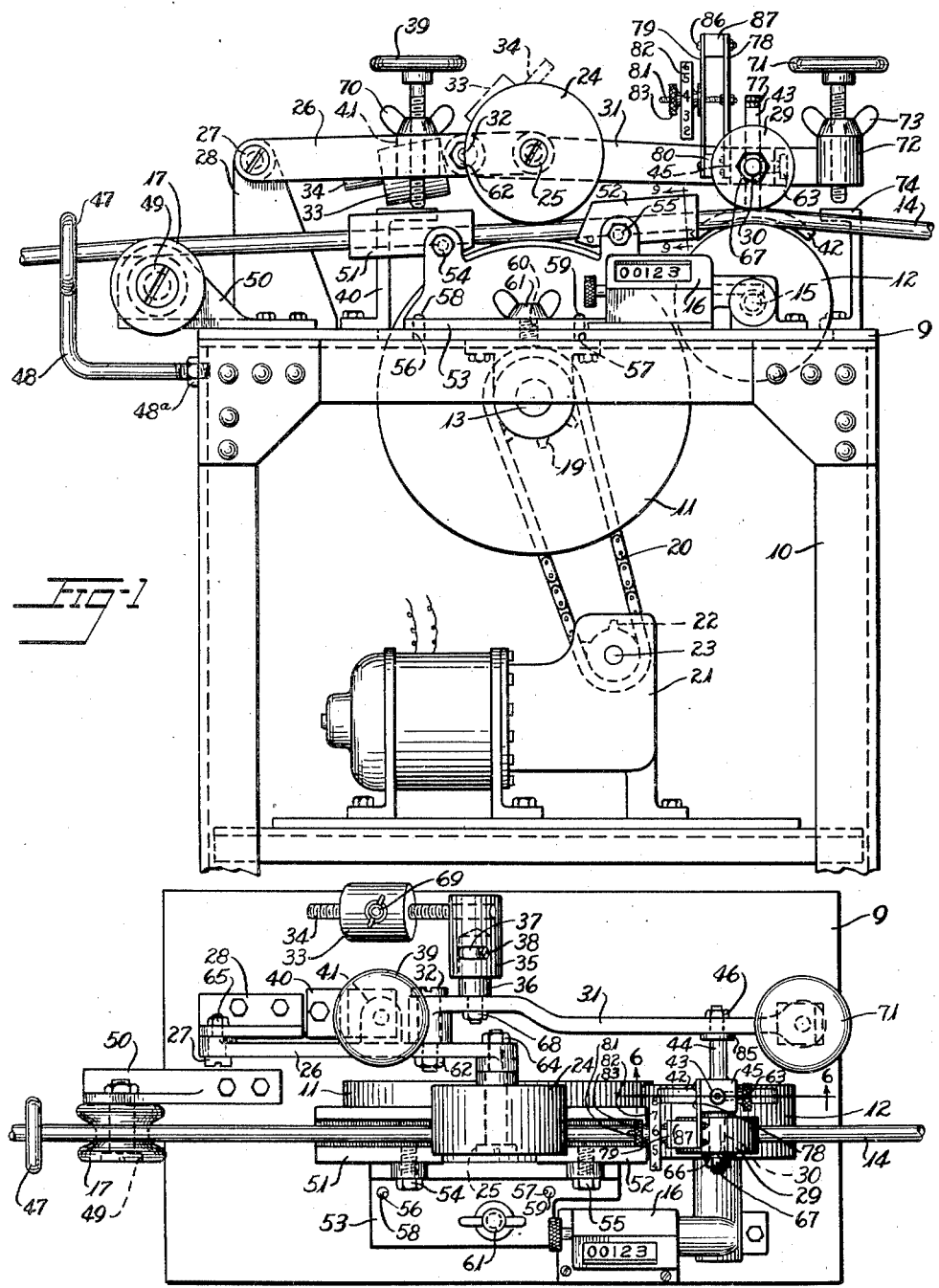

2,494,732

UNITED STATES PATENT OFFICE 2,494,732

ROLLING CONTACT DEVICE FOR MEASURING LENGTHS OF FLEXIBLE HOSE, STRIP, AND THE LIKE

John A. Weber, Akron, Ohio, assignor to The B. F. Goodrich Company, New York, N. Y., a corporation of New York Application August 30, 1945, Serial No. 613,561

10 Claims. (Cl. 33—129)

1

This invention relates to apparatus for measuring lengths of strip material and is especially useful for rapidly measuring long lengths of material, partly or wholly composed of flexible elastically-extensible and otherwise distortionable rubber-like compounds, such as hose, tubing, extruded strip and the like, as an operation in the production routine or when preparing the same for marketing or transport.

In measuring such materials, it is necessary that the means employed shall indicate the actual length "as in repose," that is, in the unstretched condition. Obviously, this is a very difficult requirement to meet for lengths of the order of 100, 500 or 1,000 or more feet, even if carefully laid out by hand on long tables, and the more so where as a matter of economy, the material is drawn at high speed from preceding processing units, or from reels, coils, and often mere piles in containers, or on skids as deposited during the previous processing.

Heretofore, apparatus for measuring long lengths of such extensible materials has not provided for counteracting the stretched condition of the same nor for handling material having a soft elastic distortionable surface, which when measured by means of a wheel of unit circumference rolling on such surface and driving a recording mechanism usually has given erroneous results by reason of the wheel progressively depressing the elastic surface immediately beneath it, stretching it to an arc that matches the wheel, whereby the total length of the surface that contacts and drives the wheel has been greater than the actual length of the strip.

Packages of strip material for the market are required to contain the amount stated on the label within certain accepted commercial tolerances. The methods and mechanisms heretofore in use required considerable labor and time for measuring strip materials, especially for materials of slow shrinkage characteristics, necessitating the inclusion of excess in the package to insure that the length of material, if ultimately measured "in respose" would dependably be found equal to or longer than the minimum length called for by said tolerance.

The apparatus of this invention measures strip materials at high speeds and because of the means provided for establishing a condition closely approximating "in repose" in materials of a wide range of shrinkage characteristics before applying the measuring means thereto, the resultant indications of the counter are sufficiently accurate that the excess allowed in the package to insure

2 meeting tolerances can be substantially reduced, providing a considerable saving of finished goods in production of hose, auto-body and upholstery strip and related products.

Objects of the invention are to provide means for measuring at high speed material in long lengths in the "unstretched condition"; to provide for conditioning the material before measurement by eliminating internal strain; to provide for controlling the pressure of the measuring wheel against the surface of the material; to insure improved accuracy in indications of length; to provide for advancing the material to the measuring wheel by force exerted on the material at a position in advance of the measuring wheel; to provide for disengaging cohering coils of the material approaching from the supply end, upon necessity, restraining tangled coils from being drawn into the apparatus; and to provide for quickly adapting the apparatus to the characteristics of the size and type of material to be measured.

These and other objects will appear from the following description and the drawings.

Of the drawings,

Fig. 1 is a side elevation of apparatus embodying the invention and the strip material therein;

Fig. 2 is a top view of the apparatus showing the horizontal disposition of the parts and their relation to the strip material;

Fig. 3 is a side view and Fig. 3ª is an end view of a modification of guide 52;

Fig. 4 is a side view of a modification of guide 52 for exerting an adjusted pressure on the material;

Fig. 5 is an end view of the guide of Fig. 4;

Fig. 6 is a section taken along line 6—6 of Fig. 2;

Fig. 7 is a top view of the brake assembly for roll 29;

Fig. 8 is a side view and Fig. 8ª an end view of the gauge block 88.

Fig. 9 is a cross-sectional view of the guide 52.

The illustrated embodiments of the invention will be briefly described in their entirety and more extended discussion of the various arrangements of mechanism will be made later in connection with the discussion of the operation of the apparatus on various materials. The apparatus may be described briefly as follows:

Referring to the drawings, the numeral 10 designates a table-type frame supporting the plate 9 on which the idler roll 17, the driving drum 11 and the measuring drum 12 are rotatably mounted with their axes in parallel relation and in such order that the strip of material 14 enters the apparatus over idler 17, passes over drum 11, thence over drum 12 and to disposal (not shown).

The driving drum 11 is fixed to the shaft 13 which is journalled in bearings fixed to the plate 9. Sprocket 19 is fixed to said shaft. Chain 20 connects sprocket 19 to sprocket 22, fixed to shaft 23 of a motorized speed-reducing unit 21 secured to frame 10, as shown. Measuring drum 12 is fixed to the spindle 15 of a revolution counter, and indicator 16 is secured to plate 9. Idler roll 24, of suitable weight, bears on the material 14 and presses it onto tractive contact against driving drum 11. It is supported in operative relation thereto by the shouldered and threaded pin 25 located in its bore and fixed to lever 26 by the nut 64, as shown. Said lever 26 is hinged to the bracket 28 by the shouldered and threaded pin 27 which passes through it and is secured by the nut 65, as shown. Idler roll 29 presses the material 14 into tractive contact with the drum 12 and is rotatively supported in operative relation thereto by the spindled end 30 of the stud 44, which stud is secured to lever 31 by the collar 85 and the nut 46.

Lever 31 is hinged to lever 26 as by the shouldered and threaded pin 32, which pin is locked to lever 26 by the nut 62. Roll 29 is retained on the aforesaid spindled end 30, as by the collar 66 and nut 67, as shown. Stud 44 is bored, at a cubical enlargement 45 thereof, to slidably receive a sleeve 43 of an assembly (see Fig. 6) carrying brake shoe 42, set screw 63 serving to retain such sleeve in any desired vertical setting. A counterweight 33, adjustably mounted on lever 31, is provided for varying the pressure of roll 29 on the material 14. Its mounting comprises the stud 36 secured to lever 31 by the nut 68, sleeve 35 rotatively fitted over said stud and slotted as shown at 37 to be allowed a limited travel by the retaining screw 38 and the graduated rod 34 fixed in said sleeve.

Counterweight 33, slidably fitted on said rod, is adjustably secured thereto by the set screw 69. Counterweight 33 may be positioned as shown in solid lines in the figures or as indicated by the dot-and-dash position shown in Fig. 1 by reason of the aforedescribed slot 37 and screw 38, each position having an appropriate effect on the pressure of roll 29 against the material 14.

A controlled retardation of roll 29 when operating on some materials, as will be explained hereinafter, is desirable and is provided for in the assembly (Fig. 1) that applies a brake shoe 80 to said roll. The bracket 78 is attached to the cubical enlargement 45 of stud 44, as shown. Said bracket supports the leaf spring 79 which is secured to it by the bolts and nuts 86 together with the spacer 87. Said spring terminates on brake shoe 80. A stud 81 is anchored in the bracket 78 as shown and extends through an appropriate hole in the said spring. A graduated wheel 82, as shown, is threaded on stud 81 and bears on said spring to adjustably flex it and vary the pressure of brake shoe 80 on the roll 29, thereby establishing the desired controlled retardation. The locknut 83 serves to retain said wheel in any desired setting.

The hand screw 39 and its associated assembly limits the travel of roll 24 towards the drum 11 after the trailing end of the material 14 passes the bight of rolls 11 and 24. The assembly comprises the hand screw 39 threading into the lug 41 of lever 26; the winged locknut 70, and the cooperating anvil 40, attached to plate 9. A similar assembly comprising the hand screw 71 threading into the boss 72 of lever 31, winged locknut 73, and the cooperating anvil 74, attached to the plate 9, similarly limits the travel of the roll 29 towards the drum 12 after the aforementioned end of material 14 passes by.

Sleeve 43, as previously mentioned, is part of the brake assembly (Fig. 6) comprising said sleeve, the brake shoe 42, the rod 76 fixed to said shoe and adapted to slide in the bore of said sleeve, the locknuts 77 limiting the travel of said rod as actuated by the spring 75, and the said spring of such proportions as to apply the brake shoe upon occasion to drum 12 with suitable pressure.

The angle plate 53 supports the guides 51 and 52 which are adjustably attached to it by the cap screws 54 and 55 which, as shown, pass through suitable holes in the plate and thread into the respective guides. The guides are settable to conform to the angular position of the material 14. Angle plate 53 has the holes 56 and 57, which fit over the dowel pins 58 and 59 fixed in the plate 9, and the hole 60, to receive the winged head thumbscrew 61 which threads into the plate 9, to secure the guide assembly detachably in place.

The eye 47, constituting a guard and a stop, is somewhat larger on the internal diameter than the cross-section of the material 14 that is to pass through it and, as shown, is readily replaceable by others of different sizes. Said guard may be made of heavy rod formed into an eye as at 47 and bent at right angle to form the arm 48, and threaded at the end to be screwed into the frame 10 and secured against turning by the locknut 48$^a$. Idler guide roll 17 serves to support the material 14 out of chafing contact with the eye 47 and the guide 51. Said roll rotates freely on the supporting screw 49 which is fixed in the bracket 50, which bracket is fastened to the plate 9, as shown.

Guide 52 may be made in various forms to suit the many forms of elastically-stretchable strip material, which the apparatus has been devised to measure. Fig. 3 shows a modification 52$a$ in which the guide is tubular to prevent bending of the enclosed material as it is thrust through the tapered bore thereof. Such channel may be of circular, rectangular or of other cross-section. It may fit loosely or more or less tightly, as will hereinafter be explained. Figs. 4 and 5 show another modification 52$b$ to suit another group of stretchable strip materials requiring an adjustment of the guide and the pressure of the same on the material as same is thrust through the channel. In said figures, the lower part of the guide is channeled for material of circular cross-section. Other channels may be provided for other cross-sections. Referring to Figs. 4 and 5, a suitable shoe as 52$s$ is hinged at 52$c$ to bear on the material and cooperate with guide 52$b$ to retard the progress of the material by friction, and said shoe carries the controlling weights 52$d$ secured by the pin 52$e$ to predetermine the pressure on the material at the guide. The guide 52, or its modifications, may be secured to the angle plate 53 interchangeably by the screw 55 to suit the material to be measured.

The operation of the apparatus is as follows:

The strip material 14, which may be tubing, hose, solid rounds, extruded shapes or some other kind of long-length flexible, elastically-stretchable strip, may enter the apparatus more or less stretched from equipment working on a preceding processing, or it may be drawn from reels or coils or from spiral "pancakes" as cured on trays, or simply out of piles in containers or on skids or on the floor, from which sources (not shown) as a matter of economy, it is desirable to pass it directly into the apparatus for measurement without further preparation. It is desirable that the material be received as it issues from preceding processing apparatus or is drawn from said reel, coils, "pancakes" and the like, free of knots.

The material is threaded through the guide eye 47 over the roll 17 through the guide 51 through the bight of roll 24 and drum 11 through guide 52 then carefully through the bight of roll 29 and drum 12 so as to register length accurately from the leading end thence to disposal (not shown) beyond the apparatus. The order of succession of the aforenamed elements of the apparatus is adapted to prevent disturbing and falsifying indications of counter 16 by rectifying difficulties encountered in threading the apparatus, as the material-guiding and advancing elements are arranged to precede the measuring means in the course of travel of the material, so that any manipulation of the material or adjustment of guiding and driving means that may be necessary is completed before the leading end need be placed in contact with the measuring drum 12, a great advantage, especially where the cumulative total of a plurality of separate lengths is sought.

After threading the apparatus, power is applied to the motorized unit 21 setting in motion the drum 11, which because of its tractive contact with the material 14, induced by pressure of the pivotally-mounted pressure roll 24, causes the material to advance through and over the several elements of the succession aforestated, the power-driven drum 11 pulling the material from the source into said bight and forcibly ejecting same to the succeeding elements. As an outstanding result of such forcible ejection, an important object of the invention is accomplished in that longitudinal tensile stress and accompanying elastic strain established in the material as by previous processing or by pulling it from a source may be counteracted by the succeeding compressive stress and strain, greater or less, set up in the material by the resistance and resultant counterthrust, greater or less, offered by the apparatus to its advancement as opposed to the thrust incidental to such forcible ejection of same from said bight. Means, as guide 52 and retarding roll 29, hereinafter described, are provided to predetermine such compressive stress and strain, greater or less, for the purpose of establishing in the material, preparatory to measuring, the condition previously mentioned as "in repose," that is, free from longitudinal tensile stress and elastic strain latent or otherwise.

Said means comprises elements which oppose the advancement of the material as impelled by the aforementioned thrust with a counterthrust caused by resistance of fixed or adjustable value preferably by direct frictional contact with the surface of the material or by rolls retarding the travel of the same by tractive contact free of rubbing.

As aforedescribed, the material-advancing means performs the dual function of a tensioning means on the side toward the supply of the material from a source, and equally as a detensioning means on the delivery side with a thrust towards the succeeding elements, as on this side longitudinal tensile stress is replaced by longitudinal compressive stress, and tensile strain is counteracted by compressive strain, as a result of which material of low internal friction recovers from elastic tensile strain almost spontaneously and other material of high internal friction recovers more slowly, and some such materials require application of considerable compressive stress to effect the desired results.

Some materials stretch elastically much more under a given tensile stress than others and when relieved of tensile stress recover from elastic stretch or strain spontaneously, and some such materials almost instantly attain the desired condition for measuring. Such materials require little or none of the aforementioned compressing but are usually very flexible and will sag in the reach between drum 11 and drum 12 of the apparatus and fail to advance into the measuring means. To overcome this condition, means such as guide 52 of suitable length, as shown, is provided to support said material against such sagging while recovering from stretch and to insure its advancement into the measuring means. Said guide may be open at the top and channeled to fit the material loosely, as shown in Figs. 1 and 2, to allow of the aforementioned spontaneous recovery, or said guide may be channeled to fit said material more or less snugly as a means to provide the aforementioned compressive stress with frictional resistance of fixed value for material that does not recover spontaneously quickly enough to be ready for measurement upon its entry into said measuring means.

Some material, when the compressive stress in it is sufficiently enhanced to bring it to the desired condition, tends to buckle in said reach in such open guide and a means providing support against such bending may be provided by an enclosing or tubular guide, such as the guide 52a of Fig. 3. The enclosing channel may be formed to correspond to the cross-section of the material to support it at such position as to be effective against such bending, or said channel may fit the material more tightly to offer greater opposition to its advancement and enhance the longitudinal compressive stress in the material for the purpose of accelerating its attainment of the desired condition for measurement.

Some material is constructed with elastic rubber-like compounds that require the application of considerable compressive stress to accomplish counteracting of immediately active and latent elastic strain in the short interval available as they pass from the advancing to the measuring means and are not injured by such compressive force. Others require a very nice adjustment of such compressive stress lest the effect be excessive and a tendency imparted to elongate spontaneously upon later opportunity to do so. Means for setting up in said materials such considerable and such graduated compressive stress may be provided by the modification 52b of guide 52 shown in Figs. 4 and 5. Said guide is shown with a V-shaped channel suited to material having a cross-section of circular outline. Other cross-sections may be accommodated by channels of other shapes. Materials of differing characteristics may require loading of the pressure member of said guide with weights to suit. Certain standardized products always have certain characteristics, records of the identity of the material and the weight combination producing most satisfactorily the desired effect facilitate the ready choice of weights for a given material and as there is usually a long run of any one of such materials, guide 52b is an efficient means for the aforedescribed purposes.

Subsequent to such conditioning for measurement, the material is advanced into the bight of drum 12 and roll 29 and is pressed into tractive contact with said drum thus actuating the revolution counter 16. The drum and counter are a means for measuring and indicating the number of units in a length of said material. The counter may also be used to add and indicate the cumulative total of units of length for a plurality of lengths of said material run consecutively. The drum 12 may have a circumference of unit length or multiples or a fraction thereof as desired. Said counter may be of any suitable type for exhibiting numbers indicating the total of the revolutions made by spindle 15 since the last reset.

Some material as, for instance, hose with a very thick soft elastic outside cover, yields readily to pressure against drum 12 and would be dented to conform to its curved surface. In such cases, the number of units of material surface driving the said drum might exceed the actual length of the strip material. The establishment of the arcuate dent stretches the surface of the material to correspond to the length of the arc encompassed by said dent while the length of the relatively unstretched core of the material corresponds to the chord of such arc. The percent difference may be quite appreciable and applied to a 100 foot length may result in a package some units short of what it may be labeled to contain. As the stretched portion of cover left the indenting member, it might recover its former unstretched condition, but the drum would measure and cause the indication of the units of the total surface, stretched or otherwise, that it actuated it, hence, if the measuring drum was permitted to cause unrestricted a substantial dent by reason of pressure greatly exceeding that required to establish traction sufficient to actuate the same, the counter 16 would indicate a length appreciably greater than the actual length of the material that passed through the apparatus. Such discrepancy is held within a small tolerance by means provided to control the depth of dent within predetermined limits. Such means is provided for each of two general classes of materials and either or both may be employed as may suit the characteristics of the particular material to be measured.

Some material, as received at the apparatus, is not of uniform diameter or thickness, and in maintaining tractive contact between such material and the drum 12, the roll 29 necessarily has to be free to move up and down with the changing thickness; the surface, however, is usually quite uniform to durometer test, a characteristic of rubber-like materials, because of the uniform methods employed in their processing. The depth of dent, hence the surface stretch of such material, may be closely determined by an adjusted constant load on roll 29. Means for this purpose is provided in the weight 33 adjustable on the graduated arm 34. Inasmuch as the mounting of said roll has to be quite rugged necessitating a relatively heavy lever 31 while the pressure of said roll on the material needs at times to be quite light, said adjustable weight is employed as a counterpoise.

Other material, cured in molds, such as hose cured in extruded lead casing, is very uniform in thickness or diameter throughout its length. For such material, the dent-depth control means may comprise, in effect, a settable gauge, comprising roll 29 and drum 12 together with the accessory gauge-block 88, which upon setting the apparatus for a given material, is placed in the bight of drum 12 and roll 29 spacing the same apart by a given step of said gauge-block, then adjusting hand screw 71 to contact anvil 74, and locking same in such adjustment by means of the wing nut 73. Certain strip material can be measured to closer tolerances with the gauge-type means than with the load-control type, but each is a means suited to a class of materials and both should be immediately available to operate on the miscellaneous succession of elastic stretchable strip materials the apparatus is devised to measure.

Where the counterweight 33 is used in measuring soft materials, the arm 34 is employed in the position shown in full solid lines in the drawings. Materials with harder surfaces do not present the dent surface-stretch difficulty but require greater pressure in the bight of drum 12 and roll 29 to obtain the desired traction on said drum because of their inherent lower coeficient of friction and the usual presence of adherent mica powder or other surface lubricant.

With respect to such hard surface materials, means to make a quick change-over to high pressure conditions has been provided by the mounting of weight 33 to fulcrum above stud 36 near fulcrum 32 of lever 31. By rotating arm 34 to the position indicated by dotted lines in the drawings, it becomes a concurrent instead of a counterweight with relation to lever 31 and roll 29. For use on such hard-surfaced materials a multipointed star wheel may replace drum 12.

Immediately the trailing end of a length of material passes out of the drum 12 and roll 29 bight, the said drum must cease rotation to prevent false recording of the counter 16. A suitable means to this end has been provided in the brake shoe 42 controlled by oscillatably-supported roll 29 through their common support-arm 44. The adjustment of the sleeve 43 in said arm at 45 is such that material present under said roll maintains said shoe out of contact with said drum. Exit of the material results in the said roll and its attached assembly dropping for lack of support, and the consequent application of brake shoe 42 to drum 12 stopping its further rotation. The spring 75 permits the application of the said brake shoe to said drum with sufficient pressure to absorb its momentum, but allows hand screw 71 to come in contact with anvil 74 to take the major share of the impact due to the falling weight of the said assembly and to protect drum 12 and its mounting which are necessarily made comparatively delicate in order to insure the desired accuracy.

Some material of wide rectangular cross-section, for instance, and highly-glossed surface is marred by rubbing. A suitable means for the purpose of detensioning such material is provided in the assembly including brake shoe 80 and roll 29. Said roll is caused to press on the material firmly by a suitable adjustment of the weight 33 to obtain sufficient traction, and brake shoe 80 is adjusted to establish drag on said roll 29 short of causing the roll to slip on the surface of the material, thus the thrust of the material is opposed to a degree that is sufficient for a large range of materials. The graduated hand nut 82 facilitates reproducing a drag condition found satisfactory for a given material, and lock nut 81 provides for maintaining said hand nut in adjustment. Roll 29 while retarding the advance of the material, rotates therewith, hence there is no marring of the aforesaid finished face as by rubbing.

As the material may move through this apparatus with considerable speed, and a free trailing end, when it arrives, may whip about dangerously, and might do damage to the apparatus and the operator, means, such as eye 47, is provided to retain the material in its proper course until such end has passed safely into the apparatus. Eye 47 is also provided for shedding coils cohering to the entering strand which are commonly encountered when drawing material from the spiralled "pancakes" in which much of it is cured. Such means effectively peels off the leading strand from the cohering coils of the spiral when some of the convolutions gather at said eye and prevents their entry as a bunch into the apparatus. The eye 47 also stops the flow of the material through the apparatus when it encounters inseparable tangles to which the size of its opening has been chosen to refuse passage. Hence, as the weight of the roll 24 is so proportioned that the resulting traction of drum 11 against the material is not sufficient to damage same, the measuring operation is halted until the attendant stops the motor, corrects the condition at said eye, and restarts the machine. As previously stated, the order of succession of the elements of the apparatus is a means to prevent disturbing the indication of counter 16 upon stoppage of the advance of the material as by eye 47 as aforedescribed. Same does not affect the condition of the material between the advancing means and the measuring means and upon the rectification of the condition at said eye, the material may again advance through the elements without the indication of the measuring means having been adversely affected. Said order of succession is thus a means that contributes substantially to the speed and capacity of the apparatus.

Idler roll 17 serves to locate the material 14 approximately centrally in the eye 47 and reduces chafing of the material by friction against stationary surfaces and lessens thereby the tensile stress of drawing the material from a source into the apparatus. Some material, if very flexible or soft, and especially in the smaller cross-sections, requires detail-guiding and support that the material shall enter the bight of the drum 11 and roll 24 with proper transverse relation to guide 52 and a guide 51 is provided to fulfill such purpose. Guide 51 may be channelled to conform to the material cross-section and is supported by the detachable angle plate 53 to which a suitable form of guide 52 is also secured. The cross-sectional dimensions and other characteristics of the material 14 varies greatly. Accordingly, it is desirable to provide for quickly exchanging sets of the guides 51 and 52 to suit. Such need is met in the illustrated embodiment by the angle plate 53 and the guides 51 and 52 which are detachably mounted as a unit on the plate 9.

Variations may be made without departing from the scope of the invention as it is defined by the following claims.

I claim:

1. Apparatus for measuring flexible strip material comprising measuring means, means for advancing the material by force exerted on the material at a position in advance of said measuring means, and means interposed between said advancing and said measuring means for limiting the extent of deflection of said material in a plurality of directions laterally thereof as it is advanced to said measuring means.

2. Apparatus for measuring flexible elastically-stretchable strip material comprising measuring means, means located in advance of said measuring means for advancing the material by thrust, and means interposed between said means including a tubular guide to support said material against bending under thrust and insuring advance of same to said measuring means.

3. Apparatus for measuring elastically-stretchable strip material comprising measuring means, means for advancing the material by force exerted on the material at a position in advance of said measuring means, and means interposed between said advancing means and said measuring means for supporting said material in a plurality of directions laterally thereof against bending under thrust and insuring advance of same to said measuring means.

4. Apparatus for measuring elastically-stretchable strip material comprising material-measuring means, material-advancing means to impart thrust to the material at a position in advance of said measuring means and guide means interposed between said means, said guide means being channelled to fit the material snugly to cause by friction with said material a counter-thrust on said material.

5. Apparatus for measuring compressible-elastic strip material of uniform thickness comprising measuring means including a drum driven by the material, a roll to press the material into tractive contact with said drum, and means to maintain a given minimum spacing between the said drum and said roll to predetermine the length of the arc of contact of said drum and such material.

6. Apparatus for measuring elastically-stretchable strip material, said apparatus comprising a measuring roll arranged to be driven by progressive contact with the strip material, a feed roll arranged to contact the strip progressively in advance of said measuring roll, a pressure roll arranged to press said strip progressively into engagement with said feed roll, a pressure roll arranged to press said strip progressively into engagement with said measuring roll, means for pivotally supporting both said pressure rolls, and a single means for simultaneously changing the pressure of both said rolls against the strip.

7. Apparatus for measuring elastically-stretchable strip material, said apparatus comprising a measuring roll arranged to be driven by progressive contact with the strip material, a feed roll arranged to contact the strip progressively in advance of said measuring roll, a pressure roll arranged to press said strip progressively into engagement with said feed roll, a pressure roll arranged to press said strip progressively into engagement with said measuring roll, means for pivotally supporting both said pressure rolls, a single means for simultaneously changing the pressure of both said rolls against the strip, and means for limiting pressing movement of said pressure rolls.

8. Apparatus for measuring flexible strip material subject to lateral deflection when pushed, said apparatus comprising a measuring roller, a feeding roller in advance of said measuring roller for advancing the material thereto, a guide between said rollers for limiting the extent of lateral deflection of the material, and pressure rollers for holding the material in frictional engagement with the feeding and measuring rollers.

9. Apparatus for measuring flexible strip material subject to lateral deflection when pushed, said apparatus comprising a measuring roller, a feeding roller in advance of said measuring roller for advancing the material thereto, a guide between said rollers for limiting the extent of lateral deflection of the material, pressure rollers for holding the material in frictional engagement with the feeding and measuring rollers, and means for limiting the pressure of said pressure rollers against the material.

10. Apparatus for measuring flexible strip material subject to lateral deflection when pushed, said apparatus comprising a measuring roller, a feeding roller in advance of said measuring roller for advancing the material thereto, a guide between said rollers for limiting the extent of lateral deflection of the material, pressure rollers for holding the material in frictional engagement with the feeding and measuring rollers, lever means supporting said pressure rollers for movement toward and from said feeding and measuring rollers, and stop means for limiting the pressure of said pressure rollers against the material.

JOHN A. WEBER.

REFERENCES CITED

The following references are of record in the file of this patent:

UNITED STATES PATENTS

| Number | Name | Date |
| --- | --- | --- |
| 189,957 | Richardson | Apr. 24, 1877 |
| 1,371,028 | Hosch et al. | Mar. 8, 1921 |
| 1,947,399 | Umansky | Feb. 13, 1934 |
| 2,115,737 | Menschner | May. 3, 1938 |
| 2,253,701 | Grunbaum | Aug. 26, 1941 |

FOREIGN PATENTS

| Number | Country | Date |
| --- | --- | --- |
| 422,734 | Great Britain | Jan. 17, 1935 |
| 667,353 | Germany | Nov. 9, 1938 |